Dec. 7, 1965  A. B. WILSON  3,221,503
METHOD OF PRODUCING RELATIVELY-CALM WATER AREA
Filed June 28, 1961  4 Sheets-Sheet 1

INVENTOR.
ALLEN B. WILSON
BY
ATTORNEYS

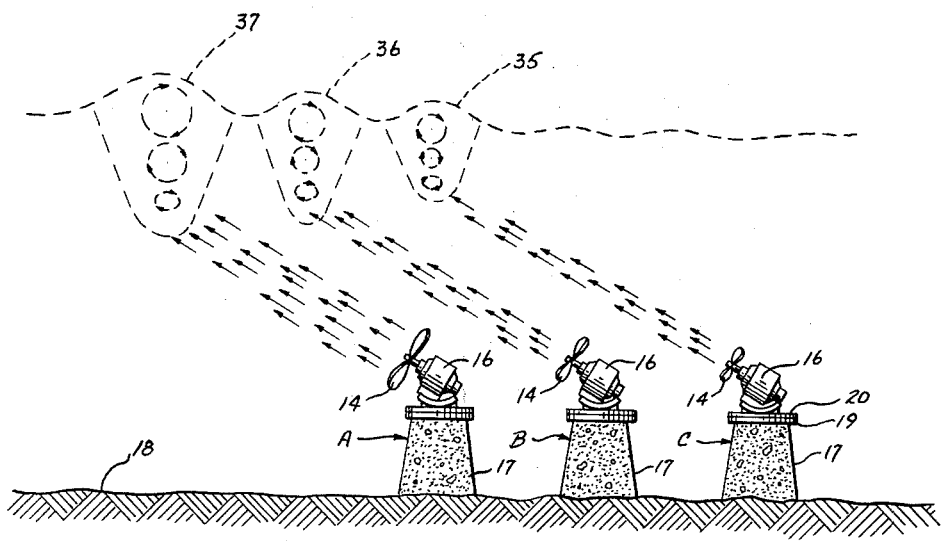
FIG.3
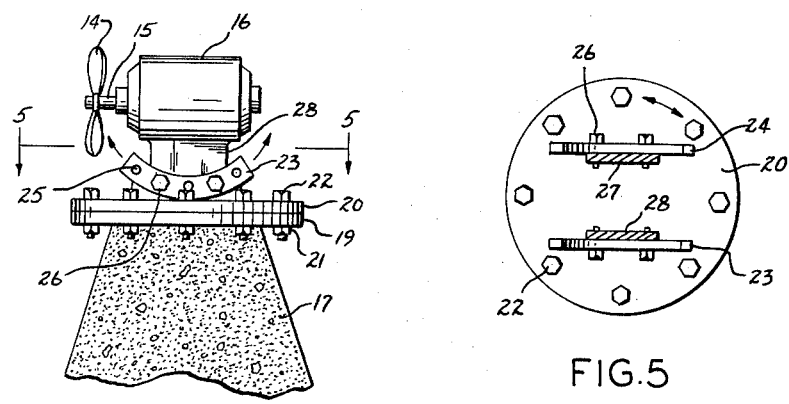
FIG.4
FIG.5

Dec. 7, 1965 A. B. WILSON 3,221,503
METHOD OF PRODUCING RELATIVELY-CALM WATER AREA
Filed June 28, 1961 4 Sheets-Sheet 3

INVENTOR.
ALLEN B. WILSON
BY
ATTORNEYS

INVENTOR.
ALLEN B. WILSON
BY
Bryley, Baird, Clayton, Miller & Vogel
ATTORNEYS

United States Patent Office

3,221,503
Patented Dec. 7, 1965

3,221,503
METHOD OF PRODUCING RELATIVELY-CALM WATER AREA
Allen B. Wilson, 2920 NE. 19th St., Pompano Beach, Fla.
Filed June 28, 1961, Ser. No. 120,397
1 Claim. (Cl. 61—6)

The present invention relates to improvements in the art of protecting harbors and other chosen areas from the damaging effects of waves, and more particularly to a highly improved method and apparatus for causing waves in a body of water to subside.

Because of the huge amounts of energy that are transmitted by waves of any substantial size on bodies of water, the matter of providing adequate protection against wave damage, and the provision of safe, quiet-water areas, have been problems with which men have struggled for hundreds of years. The amounts of energy that must be dissipated when waves on relatively large bodies of water are arrested often becomes almost unbelievably great, and a very substantial amount of literature exists concerning the forces produced by waves and the difficulties involved in building ordinary breakwater structures of sufficient mass and secure foundation to withstand these forces. One brief but interesting article on the subject, for example, may be found in the 1955 edition of the Encyclopaedia Britannica, volume 4, at pages 68 to 70, where it is pointed out that sections of ordinary stone, steel and concrete breakwaters weighing more than 1,000 tons have been known to have been moved by the forces of waves striking the sections. It is there also mentioned that the force exerted by waves against one masonry breakwater was calculated to have been two tons per square inch. It will thus be appreciate that the building and maintenance of ordinary, massive breakwater structures has been and remains an extremely expensive and time consuming undertaking even when the waves that are expected to strike the structures are not especially large.

Because of the time and expense involved in the building of breakwater structures of the traditional type just referred to, they can seldom be resorted to when the need for protection against waves is only temporary, such as during certain military operations or during exploratory off-shore drilling operations, for example. Furthermore, breakwater structures of the traditional type, when used to protect shipping harbors and the like, must have one or more sizable openings therein through which ships and other surface-craft may pass. Such openings readily admit waves into the harbor area, and objectionable harbor conditions often arise as a result thereof.

The present method and apparatus for causing waves in a body of water to subside involves a complete departure from traditional concepts, and it involves in part a utilization of the wave energy itself to cause the waves to subside.

It is a known fact that, although waves created by wind and the like appear to involve progressive linear movement or flow of water in the direction of the movement of the waves, there is no such flow of any consequence. On the contrary, each wave is manifested by a local orbiting of the individual particles of water in substantially vertical planes. Each wave, at any particular moment, involves this local orbiting of water particles not only adjacent the water surface but also well down below the portion of the wave that can be seen from the surface, the size of the individual orbits of the separate water particles progressively decreasing with depth. Each wave at any given moment, therefore, has a body defined by the area in which the water particles are in motion in their individual orbits. The body, in cross section and in deep water, is roughly V-shaped, with the uppermost portion of the V occupied by the visible portion of the wave and the remainder of the V occupied by the under-water portion thereof. This inherent nature of the bodies of waves in water is well understood by those who have investigated the subject, and it is illustrated, for example, in the 1960 edition of Encyclopedia of Science and Technology, volume 14, page 433. Thus, it will be understood that as an advancing wave passes a given location, each particle of water adjacent to that location and within the V-shaped body of the wave beneath the visible portion thereof moves in its own generally vertically oriented, orbital or substantially closed path—each particle moving upwardly and forwardly and then downwardly, and finally rearwardly and upwardly in a curved path substantially back to its original location. The individual orbits of the separate water particles are believed by students of the subject to be substantially circular in shape in deep water and tend to become somewhat flattened or elliptical in shape in more shallow water. In any event, it will be understood that this orbital motion of the water particles is a manifestation of the wave energy.

The method and apparatus of the present invention, as will be more fully explained hereinafter, involves the discovery that the discharge of submerged streams of water against the under-water portion of a wave will distort many of the orbits of the water particles therein and, as a result of this distortion, will create turbulence in the under-water portion of the wave that builds up in a chainlike reaction due to interference with still other orbits of water particles. This creates a state of turbulence in which the energy of the water particles, and thus the wave energy, is dissipated in the turbulence and in the collisions of the millions of particles involved.

Accordingly, one of the important objects of the present invention is to provide a method and apparatus by which the above described discovery may be utilized, the method being one for causing a wave in a body of water to subside by directing a submerged stream of water against the submerged or under-water portion of the wave to distort the normal pattern of orbital motion of the water particles therein and thereby produce turbulence in which the wave energy is dissipated. Still another important object of the present invention is to provide a method and apparatus by which waves are caused to be diverted from a given area and from their normal direction of movement, by directing submerged streams of water against the submerged or under-water portions of the waves in directions having directional components normal to the movement of the waves. Other objects and advantages of the invention are to provide improvements in the practice of the method and improved apparatus for carrying out the same.

The advantages of the method and apparatus are numerous, for it will be seen that the method is relatively easy to put into practice and the apparatus is far less expensive to build and install than the massive breakwater structures that are commonly employed to provide wave protection. Furthermore, the present method and apparatus are ideally suited for use in causing waves to subside in an open harbor mouth or the like, for the apparatus may be located well below the surface of the water where it will not be damaged either by waves or other forces, and there is no interference with shipping. The method and apparatus need not be confined to such use, however. On the contrary, the method and apparatus may be used wherever it may be desired to cause waves to subside. In addition, because of the nature of the apparatus, it may be installed on a temporary basis where needed and subsequently taken up or moved to another location when and if that becomes desirable. There are many other advantages among which is the fact that, when the apparatus and method are employed for causing waves to subside in or at the open mouth of a harbor or canal or the like, the apparatus and method will tend to keep the mouth free of ice due to the circulation of water and turbulence involved.

Other objects and advantages of the method and apparatus will be understood from the following description of certain preferred forms thereof, taken with the accompanying drawings wherein, for the sake of simplicity, the method and apparatus are shown as being employed at an open harbor mouth or the like. In the drawings:

FIG. 3 is similar to FIG. 2, but showing the banks of propellers disposed at substantially the same depth and with the propellers of the different banks being of progressively lesser diameter;

FIG. 4 is an enlarged side view of one of the motor driven propellers illustrated in FIGS. 1 to 3, showing one means by which the direction of the axis of the propeller may be selectively changed;

FIG. 5 is a fragmentary horizontal cross section taken substantially along the line 5—5 of FIG. 4;

Figure 1:
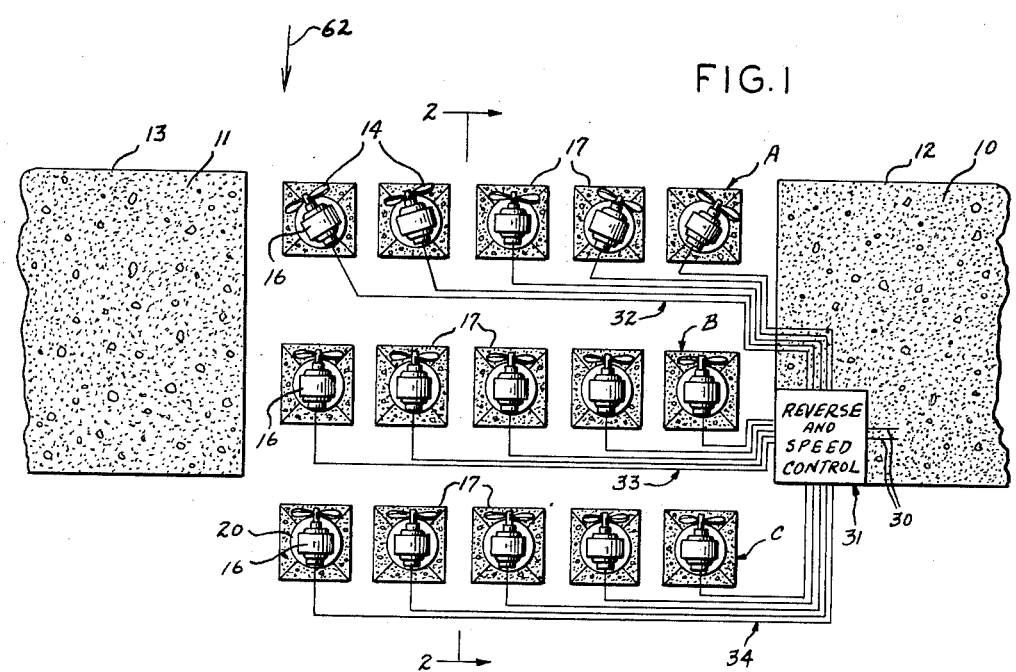
FIG. 1 is a schematic plan view of one form of apparatus of the present invention installed in the area of an open mouth of a harbor or the like, with the seaward side of the harbor mouth being located toward the upper portion of the figure.

Referring now to the drawings, and particularly to FIG. 1, the numerals 10 and 11 designate the ends of an ordinary masonry breakwater structure such as is commonly employed to define the open mouth of a harbor or other protected water area, the seaward sides of the breakwater structures being designated respectively by the numerals 12 and 13. It will be appreciated that FIGURE 1 is schematically presented and that the intervening space between the ends of the breakwater structures 10 and 11 provide an open passage through which shipping may pass.

The apparatus of the present invention is shown installed beneath the water in this open mouth of the harbor or the like for the purpose of causing waves to subside that ordinarily and otherwise would pass freely through the open mouth and into the harbor area. As illustrated the apparatus comprises a plurality of banks of motor driven propellers. The seawardmost bank is represented by the letter A, the intermediate bank is designated by the letter B and the innermost bank is designated by the letter C. For simplicity of illustration only three banks have been shown, but it will be understood that more banks may be employed and many more motor driven propellers may be used in each bank where the conditions expected to be encountered require the use of more apparatus.

The apparatus employed for mounting the individual motor driven propellers may in each case be identical. In the form illustrated each propeller 14 is fixed upon the outer end of the shaft 15 of an electric motor 16 of the submersible type, but it will be readily appreciated that other mechanism such as mechanical drive shafts and the like may be employed for mounting and driving the propellers. In the form shown each submersible electric motor 16 is mounted atop a base 17 of concrete or the like which rests or is anchored upon the bottom 18 of the harbor mouth. Bases of other structure, such as fabricated iron or steel, may of course be used. The uppermost end of each base 17 has fixed thereto a circular metal plate 19 having a plurality of bolt receiving openings adjacent its periphery. A second circular plate 20 rests upon the plate 19 and it has a corresponding number of bolt receiving openings formed therein, the two plates being secured together by a plurality of nuts 21 and bolts 22, the latter of which extend through the bolt receiving openings of the two plates. The upper plate 20 has a pair of upstanding arcuate flanges 23 and 24 formed thereon which have a plurality of bolt receiving openings 25 provided therein. These latter openings receive bolts 26 which extend through and are secured to a pair of downwardly extending flanges 27 and 28 formed on the under portion of the casing of the submersible motor 16. It will be appreciated that by changing the position of the flanges 27 and 28 with respect to the arcuate flanges 23 and 24, and by the utilization of different bolt holes 25, the angular disposition of the axis of the motor shaft 15 may be selectively varied with respect to the horizontal. Similarly, by removing the bolts 22 and nuts 21, the plate 20 may be rotated with respect to the plate 19, whereupon the bolts 22 may be reinstalled, thereby providing selective adjustment of the angularity between the motor shaft 15 and the line of waves approaching the open mouth of the harbor between the ends of the breakwater structures 10 and 11. It will thus be understood that in the present embodiment of the invention each and every one of the motor driven propellers 14 may be selectively adjusted so that the direction of the submerged stream of water produced thereby when the propeller is rotated may be varied. In the particular adjusted positions illustrated in FIGS. 1, 2 and 3 the angular disposition of the motor shafts with respect to the horizontal is substantially uniform but, as seen in FIG. 1, the adjustment of the angularity of the motor shafts with respect to the plane of the forward walls 12 and 13 of the breakwaters 10 and 11 in the bank A differs from the corresponding adjustment in the banks B and C in that the axes of the pairs of propellers 14 at opposite ends of the bank are disposed in diverging directions with respect to each other so that the submerged streams of water produced by these propellers will provide a spreading or fan-like pattern.

Figure 2:
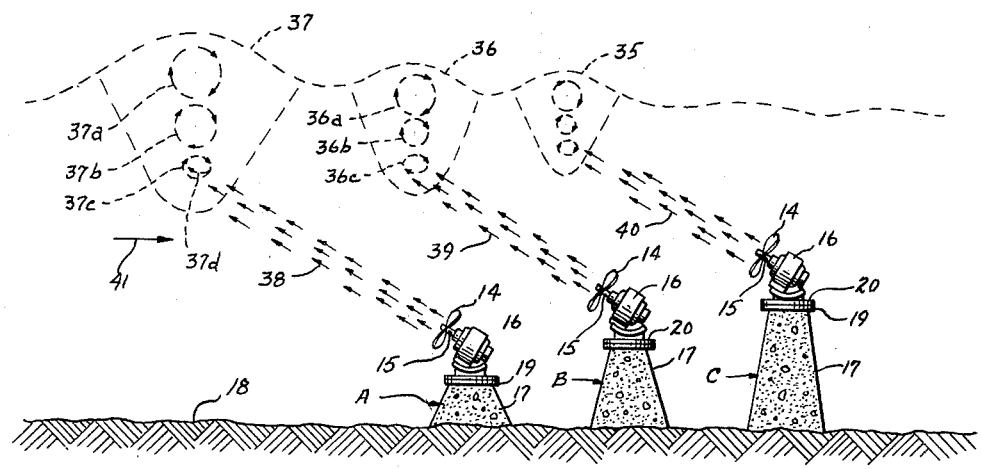
FIG. 2 is a schematic vertical cross-sectional view taken substantially along the line 2—2 in FIG. 1 in order to show the nature of waves approaching the apparatus and in order to show that the banks of propellers illustrated in FIG. 1 are disposed at different depths.

The bases 17 for the motors and propellers in the banks A, B and C are shown in FIG. 2 to be of progressively increasing height so that the propellers and motors in the forward bank A are lower than those in the succeeding bank B, while the elevation of the motors and propellers in the bank C is higher than the corresponding elevation of the motors and propellers in bank B. Another preferred arrangement of the motors and propellers, however, is illustrated in FIG. 3 wherein the bases 17 of the motors and propellers in all three banks are of the same height, but the diameter of the propellers 14 in the bank A are larger than those in bank B and the propellers of bank B, similarly, are larger than those in the bank C.

As schematically illustrated in FIG. 1, electric power lines 30 extend from a suitable power source, not shown, to a reverse and speed control apparatus of any suitable construction mounted upon the upper surface of the breakwater 10. This reverse and speed control apparatus has been designated in FIG. 1 by the numeral 31, and inasmuch as its construction and arrangement may be of any well known kind, it has been here shown only in block form, its purpose being to provide individual speed control for each of the motors 16 in the several banks of motors and to provide selective reversing for any one of the motors. From the reverse and speed control mechanism 31 individual electric cable assemblies extend beneath the water to the individual motors 16 in each of the banks A, B and C. The submerged cable assemblies are shown schematically and those extending to the motors in bank A have been collectively designated by the numeral 32, those extending to the motors of bank B have been collectively designated by the numeral 33 and those extending to the motors of bank C have been collectively designated by the numeral 34. The reverse and speed control facility provided by the control assembly 31 is desirable in order that the speed and direction of the propellers 14 in the banks A, B and C may be selectively varied in order to meet various wave conditions that may be encountered. These variations may include such things as differences in the sizes of the waves approaching the open harbor mouth between the ends of the breakwater structures 10 and 11 as well as differences in the direction from which the waves approach.

For purposes of illustration, three waves, designated by the numerals 35, 36 and 37, have been illustrated schematically in FIGS. 2 and 3, these waves being intended to be representative of waves that may approach and enter the open harbor mouth between the ends of the breakwater structures 10 and 11. The submerged streams of water produced by the several motors and propellers in bank A are represented by the collection of arrows designated by the numeral 38 and the corresponding submerged streams of water produced by the several motors and propellers in banks B and C are respectively represented by the collection of arrows designated by the numerals 39 and 40. As will be observed in FIG. 2, the base or underwater portion of a full size wave 37 approaching the harbor mouth moves into position in which streams of water 38 are directed thereagainst. The orbital motions of representative water particles in the wave 37 are illustrated by the broken lines 37a, 37b and 37c therein. As the wave 37 moves in the direction of the heavy arrow 41 shown in FIG. 2, the base or under-water portion of that wave comes into the path of the submerged water streams 38, and the force of the water streams 38 thereupon cause deflection of the normal orbital patterns of the water particles in the lower portion of the wave body. This deflection and displacement of the normal orbital patterns of the water particles causes many of the water particles to change course in the general direction of the broken-line arrow 37d, with the result that these latter particles collide with other particles and a state of turbulence is created in the lower portion of the body of the wave 37. This turbulence and the collision of the water particles one against another tends to build up, with the result that a substantial portion of the energy in the lower portion of the wave 37 is dissipated. This dissipation of a portion of the wave energy of the wave 37 causes the wave to subside partially so that it will then resemble in size the next preceding wave which is designated in FIG. 2 by the numeral 36. As the wave 37 continues to move it will reach the same position shown to be occupied in FIG. 2 by the wave 36 and will then be subjected to the streams of water 39 produced by the propellers 14 of the bank of propellers B. This same effect upon the wave 37 is shown in FIG. 2 as being applied to wave 36 where representative orbital motions of water particles are designated by the numerals 36a, 36b and 36c. The streams of water 39, which, like the streams 38, are directed diagonally upwardly, serve to displace or interfere with the orbital motions of the water particles in the wave 36, with the result that the same turbulence previously described is created in the base or lower portion of the wave 36 so that a further portion of the energy of the wave 36 will be dissipated, it being understood of course that the wave 36 has previously been subjected to the effect of the streams of water 38. Thus, the energy and size of the wave 36 is reduced by the dissipation of energy and the turbulence created in its lower portion as that wave passes through the area of the submerged water streams 39 and moves on toward the position shown to be occupied by the wave 35 in FIG. 2. At the position occupied by the wave 35, the waves are further subjected to the force of the streams of water 40 produced by the propellers 14 of the bank of propellers C. Again, the force of the submerged streams of water displace and interfere with the orbital motions of the water particles in the lower portion of the wave body, again resulting in turbulence which further dissipates the wave energy and results in further reduction of the wave size.

From the foregoing description it will be understood that each wave, as it approaches and enters the open harbor mouth, will be subjected successively to the streams of water 38, 39 and 40 that are produced respectively by the banks of propellers A, B and C, with the result that each wave is progressively reduced in size and its wave energy is progressively dissipated by the random turbulence created in its lower portion by the streams of water 38, 39 and 40. The result is that the waves are caused to subside and be either substantially completely eliminated or reduced in size to a level at which they will be unobjectionable and will create no damage within the harbor area. Additional banks of propellers and motors may of course be employed as conditions may require.

In addition to the wave subsiding action described above, the pairs of motors and propellers at the opposite ends of the bank A, particularly as seen in FIG. 1, serve the further function of tending to divert the approaching waves from the entrance to the harbor mouth. This is accomplished as a result of the fact that the end pairs of motors and propellers in the bank A have their axes disposed in diverging directions so that the sugmerged streams of water thereby create the fan-shaped pattern referred to above which tends to divert the oncoming waves from the mouth of the harbor entrance, thus tending to change the direction of the oncoming waves and cause them to strike the outer surfaces 12 and 13 of the breakwater structures 10 and 11.

The action of the banks of propellers and motors A, B and C in the form of the apparatus shown in FIG. 3 is substantially identical to that described above, the only difference being that the propellers and motors are all mounted at substantially the same depth and, as a result of the differences in sizes of the propellers in the several banks, the streams of water produced by the propellers of bank A are larger than those produced by the propellers of bank B, and the streams produced by the bank B are larger than those produced by the bank C. The motors 16 of the bank A may of course also be of greater capacity than those of bank B, and those of bank B may also be of greater capacity than those of bank C. This variation in the structure as shown in FIG. 3 will be desirable in certain installations for the sake of economy. Furthermore, inasmuch as a greater amount of energy is embodied in the waves first treated by the streams of water produced by the propellers of bank A, it is desirable that these streams be of greater force and volume than the succeeding streams produced by the propellers of banks B and C.

It will be appreciated that with both of the installations illustrated in FIGS. 2 and 3 all of the apparatus which resides in the water is disposed well beneath the surface thereof and below the paths of the submerged portions of the waves. As a result, none of the apparatus is subjected to a wave damage. Furthermore, all of the submerged apparatus is disposed sufficiently below the surface as to avoid any interference with ships and other surface crafts that may pass through the harbor opening. In addition, inasmuch as the streams of water produced by the propellers of banks A, B and C may desirably be directed diagonally upwardly as illustrated, dense and warm water will be constantly projected upwardly toward the surface. This circulation of water, together with the turbulence produced in the manner described above, will tend to keep the harbor mouth free of ice in winter weather.

Figure 6:
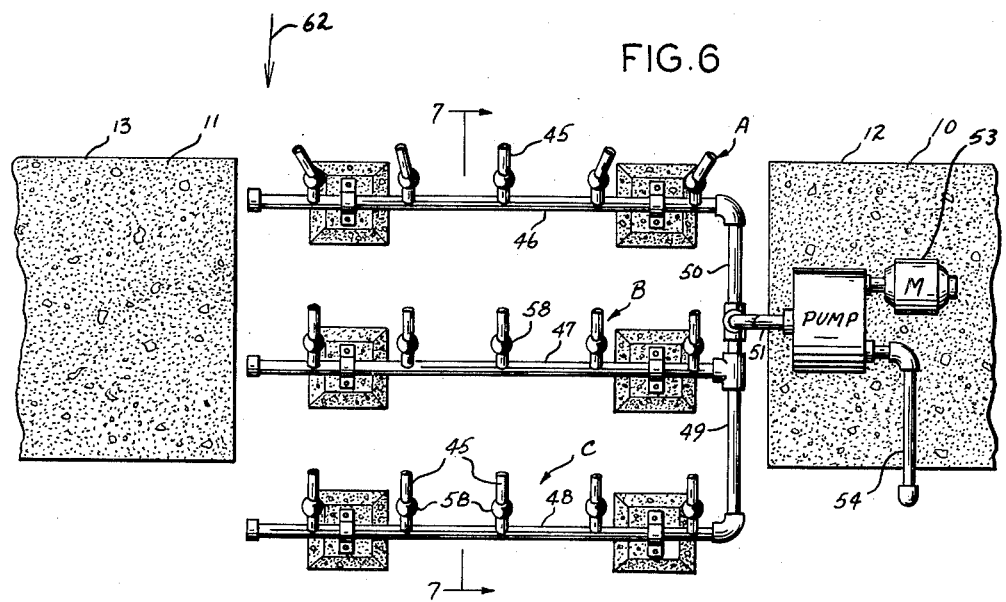
FIG. 6 is a schematic view similar to FIG. 1 but showing a modified form of the apparatus employing submerged banks of water jet discharge nozzles instead of submerged banks of propellers.
Figure 7:
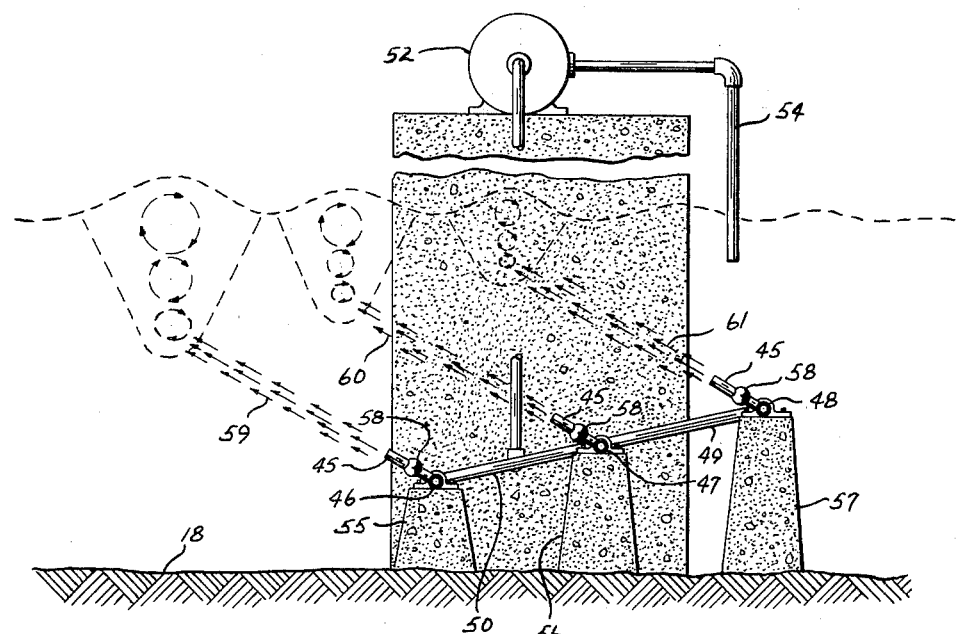
FIG. 7 is a vertical cross-sectional view taken substantially along the line 7—7 in FIG. 6.

Another variation in the apparatus of the present invention is illustrated in FIGS. 6 and 7 wherein submerged water jet nozzles are substituted for the driven propellers described above. The nozzles 45, like the propellers 14, are arranged in banks which are designated by the letters A, B, and C, each bank being comprised of a plurality of nozzles to which water is supplied under pressure by a suitable conduit, the conduits for the banks A, B and C being respectively designated by the numerals 46, 47 and 48. The conduits 46, 47 and 48 are joined by suitable intermediate conduits 49 and 50, the latter of which is connected to a supply conduit or pipe 51 which leads to a large volume water pump 52 driven, for example, by an electric motor 53. The pump, if desired, may be suitably mounted atop the breakwater structure 10, and the pump is provided with an intake conduit 54 which extends downwardly from the pump into the water on the harbor side of the breakwater structure 10.

The supply conduits 46, 47 and 48 for the banks of nozzles A, B and C may be suitably mounted upon upstanding pillars or supports 55, 56 and 57 which rest upon the bottom 18 of the harbor entrance. Again, any suitable structure may be employed for supporting the supply conduits 46, 47 and 48, including structural steel elements and the like.

Each water jet nozzle 45 is carried and supported by its supply conduit 46, 47 or 48 and is provided with a universal joint 58 therein so that the discharge direction of the nozzles may be selectively varied. As in the case of the motor driven propellers in FIG. 1, the discharge directions of the nozzles 45 of the banks A, B and C are substantially parallel with the discharge being directed diagonally upwardly toward the base portions of oncoming waves. The pairs of nozzles adjacent the ends of the bank A, however, are arranged in diverging directions similar to the corresponding propellers of the bank A in FIG. 1 and for the same purpose of tending to divert oncoming waves from the harbor entrance.

As best seen in FIG. 7, the bank B of nozzles is disposed at a higher elevation than those of bank A, and the bank of nozzles C is disposed at a higher elevation than those of the bank B. The several nozzles of the banks A, B and C discharge diagonally upwardly directed streams of water in the same fashion and for the same purpose as the propellers previously described, it being understood of course that water is supplied to each of the nozzles by the operation of the pump 52. The streams of water produced by the nozzles 45 of the bank of nozzles A are designated by the numeral 59 in FIG. 7, while the streams of water produced by the nozzles of the banks B and C are respectively designated by the numerals 60 and 61. As in the case of the action of the streams previously described, the streams of water 59 are directed against the lower portions of oncoming waves with the result that the orbital motions of the water particles in the lower portions of the waves, represented by the broken circular arrows in FIG. 7, are displaced and disturbed, thereby creating turbulence in the lower portions of the wave which causes dissipation of a portion of the wave energy. This results in a partial reduction in the wave size. The same waves are thereafter subjected to the submerged streams of water 60 produced by the jet nozzles of the bank B which again disturb and displace the orbital motions of the particles of water in the lower portion of the reduced wave, thereby creating additional turbulence and further dissipation of the wave energy. These latter waves are thereafter subjected to the effect of the submerged streams of water 61 produced by the jet nozzles of the bank C which again introduces more turbulence in the lower portion of the now substantially reduced wave with the result that there is further dissipation of the wave energy. This progressive dissipation of the wave energy causes the wave to subside to the extent that the waves are eliminated or reduced in size and force sufficiently to render them unobjectionable in the harbor area.

With the form of the apparatus shown in FIGS. 6 and 7, it will be appreciated and understood that substantially all of the submerged parts are disposed well below the path of the body portions of the oncoming waves with the result that the apparatus is not subjected to wave damage nor will the apparatus in any way interfere with shipping that may pass through the harbor opening. Furthermore, as previously pointed out, the upwardly directed discharge of water will tend to maintain the harbor mouth free of ice during winter months.

It has previously been pointed out that the submerged motors 16 adjacent to the opposite ends of the outermost bank A of motors in FIG. 1 and the submerged nozzles 45 adjacent to the opposite ends of the outermost bank A of nozzles in FIG. 6 are arranged so that the submerged streams of water produced thereby are directed diagonally upwardly and outwardly in a fan-like pattern so as to tend to divert the oncoming waves from the area between the two breakwater structures 10 and 11. In this connection, the particular adjusted positions of the wave diverting motors 16 and nozzles 45 shown respectively in FIGS. 1 and 6 is such as to produce submerged streams of water that are directed against the submerged bodies of the waves at an angle with respect to the direction of movement of the waves, the direction of oncoming waves being indicated by the arrows 62 in FIGS. 1 and 6. The submerged streams of wave reflecting water are thus discharged in directions having directional components that are normal to the direction of movement of the oncoming waves so that a substantial portion of the wave energy is diverted from its original direction and from the harbor mouth or the like represented by the space between the two breakwater structures. The diverted waves thus may break harmlessly against the forward walls 12 and 13 of the breakwater structures.

Figure 8:
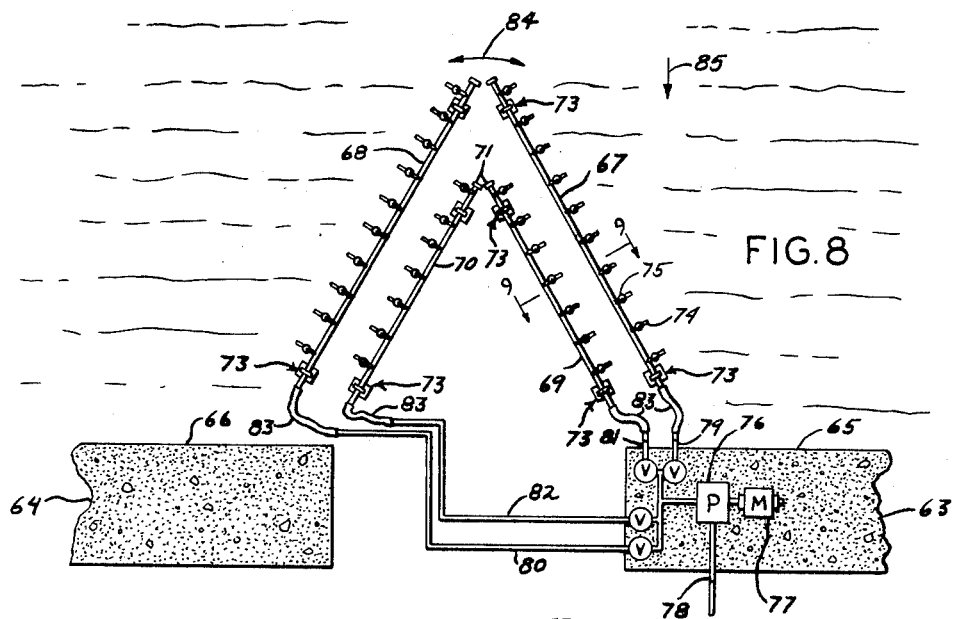
FIG. 8 is a plan view of a modified form of the submerged apparatus useful for diverting waves from the mouth of a harbor or other given area.
Figure 9:
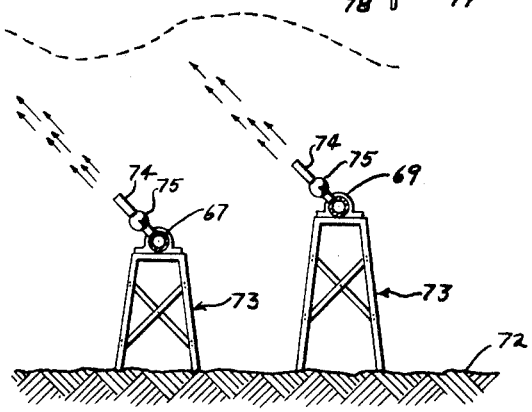
FIG. 9 is an enlarged cross-sectional view taken substantially along the line 9—9 in FIG. 8.

A further modification of this wave diverting apparatus is illustrated in FIG. 8, wherein the principal functional elements of the apparatus are submerged outwardly or seawardly of the opening or space between two ordinary breakwater structures 63 and 64 having forward or seaward walls respectively designated by the numerals 65 and 66. The apparatus comprises submerged water conduits 67, 68, 69 and 70 disposed in pairs in V-shaped configurations, the conduits 67 and 68 forming the legs of one V-shaped arrangement and the somewhat shorter conduits 69 and 70 forming the legs of a smaller V-shaped arrangement within the first. The outer ends of the conduits are closed by caps 71 or the like, and each of the conduits is preferably mounted above the bed 72 of the body of water upon the upper ends of a plurality of upwardly extending foundation elements 73 that rest upon the bed. The foundation elements may be of any suitable construction and, if desired, may be fabricated of structural steel as shown in FIG. 9, the foundation elements supporting the inner conduits 69 and 70 preferably being somewhat higher than those which support the outer conduits 67 and 68 so that the two inner conduits 69 and 70 are raised with respect to the outer conduits. Each of the conduits 67, 68, 69 and 70 is provided with a plurality of water discharge nozzles 74, with each nozzle joined to its conduit through a universal joint 75 that permits adjustment of each nozzle and adjustment of the direction of the submerged stream of water discharged therefrom.

Water is supplied under pressure to each of the conduits 67, 68, 69 and 70 by any suitable means. The apparatus for this purpose shown in FIG. 8 comprises a pump 76 which may rest on top of the breakwater structure 63 and which may be driven by any suitable motor 77. Water is supplied to the pump through an intake conduit 78 that communicates with the body of water on the harbor side of the breakwater structure 63. The high pressure discharge from the pump 76 is led to the respective conduits 67, 68, 69 and 70 through intermediate conduits 79, 80, 81 and 82, each of which is provided with its own control valve V and each of which is preferably joined to its nozzle bearing conduit 67, 68, 69 or 70 through a length of flexible conduit 83. The valves V provide means by which the velocity and discharge rate may be adjusted for the nozzles on the several nozzle bearing conduits 67, 68, 69 and 70, and the flexible conduit lengths 83 permit the group of conduits 67, 68, 69 and 70 and their support foundations 73 to be moved physically to a certain extent so that the apex of the V-shaped configuration formed by the conduits may be moved in either direction, as indicated by the arrows 84. By virtue of this movement, the apex of the V-shaped configuration may preferably be adjusted so that it points toward the prevailing direction of oncoming waves.

With the apparatus of FIG. 8 disposed in the position shown therein, it will be appreciated that each of the numerous submerged nozzles 74 will provide a diagonally upwardly directed stream of water, as indicated by the arrows in FIG. 9. The nozzles are preferably adjusted to the positions thereof illustrated in FIG. 8, with the result that the streams of water will be discharged obliquely upwardly from the nozzles and against the underwater portions of waves that approach in the direction of the arrow 85. Inasmuch as the discharge of each nozzle is directed at an angle with respect to the direction of movement of the waves, and inasmuch as the discharge from each nozzle has a directional component normal to the wave direction, the oncoming waves are progressively diverted from their original direction by the submerged streams of water to which they are successively subjected and are caused to crash harmlessly against the faces 65 and 66 of the breakwater structures, thereby preventing entry of the waves between the breakwater structures and leaving a relatively calm area within the V-shaped configuration and within the area between the breakwater ends.

As with the embodiments of the invention shown in FIGS. 1 to 7, the embodiment illustrated in FIGS. 8 and 9 offers no obstruction to shipping, and is not readily subject to damage. Furthermore, like the embodiments first mentioned, the discharge from the plurality of nozzles 74 will tend to keep the adjacent area free of ice during winter months.

Suitable adjustments may of course be made when necessary in the embodiment of the invention illustrated in FIGS. 8 and 9 in order efficiently to handle and adequately divert waves of different sizes and those which approach from directions other than that represented by the arrow 85. The operation and adjustment of the valves V provides suitable compensation for most normal variations in condition inasmuch as the valves V individually control the rates of discharge from the banks of nozzles on the conduits 67, 68, 69 and 70. Furthermore, the direction of discharge of the individual nozzles may be separately adjusted by virtue of the universal joint 75 on each and, as indicated above, the flexible conduit sections 83 permit the entire assembly of the conduits 67, 68, 69 and 70 to be shifted bodily so as to shift the position of the apex of the V-shaped arrangement of the conduits.

While the arrangement of the conduits 67, 68, 69 and 70, with their submerged water discharge nozzles 74, have been illustrated in FIG. 8 and have been described in conjunction with their use for diverting waves from the space between adjacent ends of ordinary breakwater structures, it will be appreciated that the structure and method employed therein may be used for producing calm water areas at other desired locations. If, for example, it is desired to protect a given beach area, the conduits 67, 68, 69 and 70 would be disposed off the beach in an arrangement similar to that shown in FIG. 8 but with the pump 76 and the motor 77 disposed on the beach itself or on a barge or the like. The number and length of the conduits and the number of discharge nozzles employed may of course be varied in any event to satisfy the conditions expected to be encountered.

Figure 10:
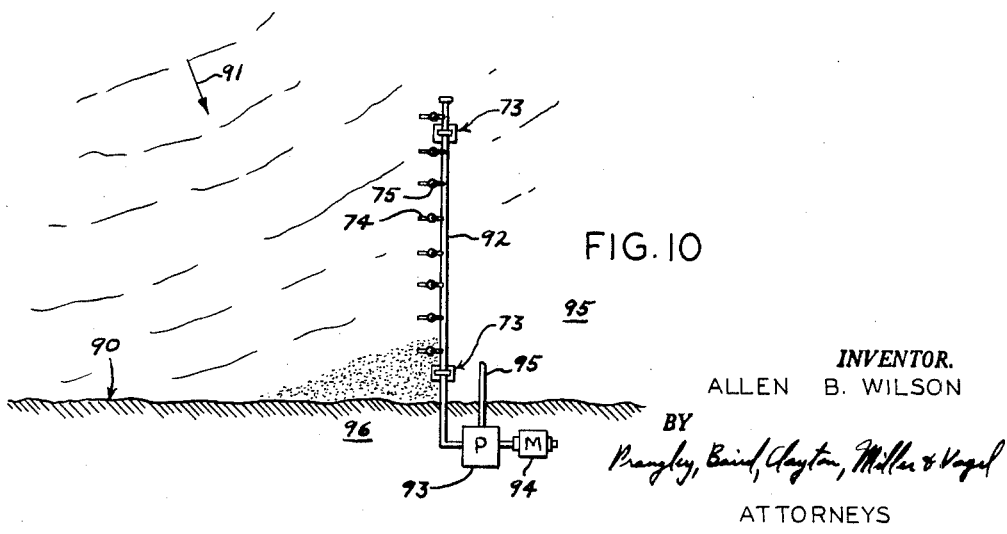
FIG. 10 is a plan view of still another form of the submerged apparatus that is useful as a substitute for a jetty or groin for protecting an area of a beach and for causing sand to collect adjacent thereto.

Still another embodiment of the invention is shown in FIG. 10 of the drawings, wherein the same principle as well as apparatus somewhat similar to that previously described are employed for the protection of a beach area in order to produce results similar to those provided by an ordinary permanent and massive jetty or groin. Such permanent jetties or groins comprise breakwater-like structures that are built outwardly from a beach, often at great expense, in order to protect the beach from the eroding effect of waves that diagonally approach the beach. In FIG. 10 the numeral 90 designates such a beach and the arrow 91 indicates the direction of movement of waves diagonally approaching the same. Instead of providing an expensive jetty or groin, however, a submerged conduit 92, similar to the previously described conduits 67, 68, 69 and 70, extends outwardly from the beach and, if desired, is supported on a plurality of foundation supports 73 like those described earlier herein. Like each of the conduits 67, 68, 69 and 70, the conduit 92 is capped at its outer end and is provided along its length with a plurality of discharge nozzles 74 that are joined to the conduit by universal joints 75. Water under pressure is supplied to the conduit 92 by a pump 93 disposed on the beach and driven by any suitable motor 94, an intake conduit 95 extending from the pump outwardly into the body of water. The pressure discharge from the pump 93 is fed through the submerged conduit 92 and is discharged from the nozzles 74 thereof preferably diagonally upwardly, as illustrated in FIG. 9, and against the underwater portions of the approaching waves at an angle with respect to the direction of the wave approach. This discharge of submerged streams of water against the under portions of the waves in a direction having a component normal to the wave movement is represented by the direction of the nozzles in FIG. 10 and causes the waves to be progressively diverted from the direction of the arrow 91 to a direction that is substantially normal to the line of the beach, thereby producing a substantially calm area in the water area designated by the numeral 95 and causing sand to be accumulated along the beach portion designated by the numeral 96. This progressive diversion of the waves from their original direction to a direction substantially normal ot the beach is accomplished entirely by the submerged streams of water discharged by the nozzles 74 of the conduit 92. The direction of the discharge from the nozzles may of course be adjusted from time to time by the use of the universal joints 75 so as to accommodate certain changes in conditions that may be encountered, and a variable speed motor 94 or a variable capacity pump 93 may be employed so as to vary the rate of discharge from the nozzles 74.

It will be appreciated that the structure illustrated in FIG. 10 accomplishes the same result as an ordinary jetty or groin, but by an entirely different method and at far less initial cost. Because of the simplicity of the apparatus, it may be moved relatively easily from place to place where needed, and because the conduit and the nozzles are submerged well below the water surface they offer little or no obstruction to shipping or beach activities and they are not readily subject to damage.

Although certain variations of the method and apparatus of the present invention have been described above, it will be understood that additional and other variations may be made therein without departing from the spirit and scope of the appended claims.

I claim:

The method of producing a relatively-calm water area in the path of waves advancing in a predetermined direction in a body of water, which comprises the steps of: producing a pair of diverging groups of submerged streams of water, with the streams of water in each group being substantially parallel, said streams originating from a depth below the lowermost level of water disturbance within the waves; and simultaneously directing said submerged streams of water of each of said groups along substantially straight parallel paths against the waves in a direction generally opposite the predetermined direction of movement of the waves, each of said paths of said streams being upwardly inclined and at an acute angle with respect to said direction of movement, said diverging groups of streams of water thereby diverting the waves from the calm water area.

References Cited by the Examiner

UNITED STATES PATENTS

| | | | |
|---|---|---|---|
| 843,926 | 2/1907 | Brasher | 61—6 |
| 1,423,640 | 7/1922 | Barlow | 61—6 |
| 1,593,863 | 7/1926 | Brasher | 61—6 |
| 2,325,937 | 8/1943 | Brasher | 61—1 X |
| 2,382,393 | 8/1945 | Bille | 61—6 |
| 2,417,519 | 3/1947 | Persson et al. | 61—6 X |
| 2,967,399 | 1/1961 | Laurie | 61—6 |
| 3,103,788 | 9/1963 | Gross | 61—6 |
| 3,109,288 | 11/1963 | Gross | 61—6 |

FOREIGN PATENTS

| | | |
|---|---|---|
| 358,737 | 12/1905 | France. |
| 1,237,407 | 6/1960 | France. |

CHARLES E. O'CONNELL, *Primary Examiner.*

WILLIAM I. MUSHAKE, EARL J. WITMER, JACOB L. NACKENOFF, *Examiners.*